United States Patent
Kinell et al.

(10) Patent No.: US 11,905,886 B2
(45) Date of Patent: Feb. 20, 2024

(54) HEATSHIELD FOR A GAS TURBINE ENGINE

(71) Applicant: Siemens Energy Global GmbH & Co. KG, Bayern (DE)

(72) Inventors: Mats Kinell, Finspang (SE); Petr Laletin, Finspang (SE); Sara Rabal Carrera, Norrköping (SE)

(73) Assignee: Siemens Energy Global GmbH & Co. KG, Bayern (DE)

(*) Notice: Subject to any disclaimer, the term of this patent is extended or adjusted under 35 U.S.C. 154(b) by 159 days.

(21) Appl. No.: 17/609,374

(22) PCT Filed: May 20, 2020

(86) PCT No.: PCT/EP2020/064026
§ 371 (c)(1),
(2) Date: Nov. 6, 2021

(87) PCT Pub. No.: WO2020/239559
PCT Pub. Date: Dec. 3, 2020

(65) Prior Publication Data
US 2022/0178308 A1    Jun. 9, 2022

(30) Foreign Application Priority Data
May 29, 2019   (GB) ..................... 1907544

(51) Int. Cl.
*F02C 7/24* (2006.01)
*F02C 7/12* (2006.01)

(52) U.S. Cl.
CPC .................. *F02C 7/24* (2013.01); *F02C 7/12* (2013.01); *F05D 2240/15* (2013.01); *F05D 2260/221* (2013.01)

(58) Field of Classification Search
CPC .......... F02C 7/24; F02C 7/12; F05D 2240/15; F05D 2260/221; F05D 2240/11;
(Continued)

(56) References Cited

U.S. PATENT DOCUMENTS

| 5,375,973 A | 12/1994 | Sloop et al. |
| 5,538,393 A | 7/1996 | Thompson et al. |

(Continued)

FOREIGN PATENT DOCUMENTS

| CN | 104564167 A | 4/2015 |
| CN | 104775859 A | 7/2015 |

(Continued)

OTHER PUBLICATIONS

International search report and written opinion dated Sep. 14, 2020, for corresponding PCT/EP2020/064026.

*Primary Examiner* — Yi-Kai Wang
(74) *Attorney, Agent, or Firm* — Wolter Van Dyke Davis, PLLC

(57) ABSTRACT

A heatshield for a gas turbine engine includes a main body having a leading edge, a trailing edge, lateral edges, a first surface and a second surface, the first surface being exposed to a hot working gas in use passing through the gas turbine engine. The main body having an array of cooling channels for conveying a coolant flow, where each cooling channel of the array of cooling channels having a surface. At least one cooling channel of the array of cooling channels includes at least one flow disturbing feature extending from the surface and into the cooling channel.

20 Claims, 3 Drawing Sheets

(58) Field of Classification Search
CPC ....... F05D 2260/22141; F05D 2260/20; F01D 9/04; F01D 5/08; F01D 11/24; F01D 11/18; F01D 25/145; F01D 25/12; F01D 9/065
USPC ........................................................ 415/177
See application file for complete search history.

(56) References Cited

U.S. PATENT DOCUMENTS

| | | | |
|---|---|---|---|
| 6,354,795 B1 | 3/2002 | White | |
| 9,624,779 B2 | 4/2017 | Schick et al. | |
| 2005/0106021 A1* | 5/2005 | Bunker | F28F 3/044 416/97 R |
| 2009/0226300 A1* | 9/2009 | Knapp | F01D 5/18 415/116 |
| 2013/0108419 A1 | 5/2013 | Brunelli | |
| 2015/0104322 A1 | 4/2015 | Schick | |
| 2015/0198063 A1 | 7/2015 | Laletin | |
| 2017/0138211 A1 | 5/2017 | Fukui | |
| 2017/0292389 A1 | 10/2017 | Lörstad | |

FOREIGN PATENT DOCUMENTS

| | | |
|---|---|---|
| EP | 2894302 A1 | 7/2015 |
| EP | 3167164 B1 | 10/2018 |
| RU | 2499145 C1 | 11/2013 |
| RU | 2500895 C1 | 12/2013 |

\* cited by examiner

HEATSHIELD FOR A GAS TURBINE ENGINE

CROSS REFERENCE TO RELATED APPLICATIONS

This application is the US National Stage of International Application No. PCT/EP2020/064026 filed 20 May 2020, and claims the benefit thereof. The International Application claims the benefit of United Kingdom Application No. GB 1907544.9 filed 29 May 2019. All of the applications are incorporated by reference herein in their entirety.

FIELD OF INVENTION

The present invention relates to a heatshield that may be used in a gas turbine engine and advantageously a heatshield having a cooling arrangement to improve temperature capability and longevity.

BACKGROUND OF INVENTION

A heatshield can be found in several locations in a gas turbine engine, for example, the heatshield can be located radially outwardly of an annular array of turbine blades. The heatshield is usually a circumferential segment of an array of heatshields which are held in position by a carrier structure. The heatshield forms part of a gas-path which channels combustion gases through the turbine that drives turbine rotor blades in a conventional manner. These heatshields have a hot side, which is exposed to the hot working gases of the turbine and a cold side facing radially outwardly, which is often cooled with cooling air. It is important that there is a minimal gap between the tip of the blade and the heatshield to minimise over tip leakage and therefore minimise efficiency losses.

US2017/0138211 A1 discloses a ring segment of a gas turbine engine and having a main body with upstanding forward and rearward hooks. The hooks attach the ring segment to a carrier structure that is radially outwardly located with respect to the rotational axis of the gas turbine engine. The ring segment comprises a cooling arrangement including an impingement plate and an array of cooling channels. The impingement plate is located radially outwardly of the main body and directs jets of air against a cold side of the main body. The array of cooling channels is formed within the main body and is supplied with the used impingement cooling air via an opening on the cold side and a gallery channel formed centrally and extending axially within the main body. The cooling channels extend circumferentially away from the gallery channel. Thus, the cooling channels extend in their longest dimension in a direction parallel to the rotation of rotor blades.

US 2013/108419 (A1) discloses a ring segment for a gas turbine engine which includes a panel or main body and a cooling system. The cooling system is provided within the panel and includes a cooling fluid supply trench having an open top portion and extending radially inwardly from a central recessed portion of the panel. The cooling system further includes a plurality of cooling fluid passages extending from the cooling fluid supply trench to a leading edge and/or a trailing edge of the panel. The cooling fluid passages receive cooling fluid from the cooling fluid supply trench, wherein the cooling fluid provides convective cooling to the panel as it passes through the cooling fluid passages.

EP3167164B1 discloses a turbomachine component comprising at least one part built in parts from a curved or planar panel, particularly a sheet metal, the part comprising a plurality of cooling channels via which a cooling fluid, particularly air, is guidable, wherein at least one of the plurality of cooling channels has a continuously tapered section.

However, these heatshields or ring segments can incur high thermal gradients not only between their hot side and their cold side but also between leading edge and trailing edge as well as between lateral edges. Such thermal gradients create loading in the heatshield that causes material fatigue and distortion of the heatshields in operation. Distortion of the heatshield may lead to rubbing of the heatshield's hot surface against rotating blades causing damage of both parts and subsequent turbine performance degradation.

Thus, it remains an objective to provide an improved heatshield which reduces distortion, reduces temperature gradients, reduces absolute temperatures and minimises the use of cooling air.

SUMMARY OF INVENTION

To address the known problems there is provided a heatshield for a gas turbine engine. The heatshield comprising a main body having a leading edge, a trailing edge, lateral edges, a first surface and a second surface, the first surface being exposed to a hot working gas in use passing through the gas turbine engine. The main body having an array of cooling channels for conveying a coolant flow, where each cooling channel of the array of cooling channels having a surface. At least one cooling channel of the array of cooling channels comprising at least one flow disturbing feature extending from the surface and into the cooling channel.

The at least one flow disturbing feature may be a pin. The pin extending from one part of the surface to another part of the surface may be such that its sides are free of contact with the surface of the cooling channel.

The or another at least one flow disturbing feature may be a part-pin. The part-pin may be attached along its length to another side of the cooling channel.

The or another at least one flow disturbing feature may comprise a second part-pin. The part-pin and the second part pin may be arranged opposite one another across the channel.

The at least one cooling channel may comprise an array of pin(s) and part-pin(s) and/or second/part pin(s) along at least a part of a length of the cooling channel. Advantageously the pin(s) and part-pin(s) and/or second/part pin(s) may be arranged in an alternating pattern with one another.

The flow disturbing feature may have a cross-sectional shape of a polygon. Advantageously the cross-sectional shape may be a quadrilateral or a parallelogram. The cross-sectional shape may have a diagonal line and the diagonal line being in-line with the longitudinal extent of the cooling channel.

The flow disturbing feature may have a plurality of side faces, wherein the angle between any two neighbouring side faces is ≥45°.

The cooling channel or cooling channels may comprise a restrictor. The restrictor forming the smallest cross-sectional area within the cooling channel.

The array of cooling channels may comprise a leading array of cooling channels and a trailing array of cooling channels. Each of the leading array of cooling channels and trailing array of cooling channels may comprise parallel, especially straight cooling channels which each extend in a direction generally perpendicular to the respective leading edge and trailing edge. The cooling channels of the trailing array of cooling channels may be longer than the cooling channels of leading array of cooling channels.

The main body has a dimension L that is perpendicular to the leading edge and the trailing edge and the cooling channels of the trailing array of cooling channels may extend 55-70% of L, advantageously 60% of L, and the cooling channels of the leading array of cooling channels may extend 30-45% of L, advantageously 40% of L.

Each cooling channel of the leading array of cooling channels may have an outlet in the leading edge of the main body. Each cooling channel of the trailing array of cooling channels may have an outlet in the trailing edge of the main body.

Each cooling channel of the leading array of cooling channels may have an inlet formed in the second surface. Each cooling channel of the trailing array of cooling channels may have an inlet formed in the second surface. Advantageously, each cooling channel may have an inlet formed in the second surface.

The cooling passage(s) located closest to the lateral edge(s) of the main body may have a plurality of outlets defined in the lateral edge such that in use coolant passes out of the cooling channel, through the cooling passage and is exhausted at the lateral edge through the outlet. Where each cooling channel has an inlet formed in the second surface, the inlet of the cooling passage(s) located closest to the lateral edge(s) of the main body being larger than the inlets of the other cooling channels.

The at least one cooling channel may have a cross-sectional shape that is polygonal, advantageously quadrilateral. Advantageously, all cooling channels have a cross-sectional shape that is polygonal, advantageously quadrilateral. Advantageously, all cooling channels have a cross-sectional shape that is rectangular, triangular or trapezoidal.

Further, to address the known problems there is also provided a heatshield for a gas turbine engine. The heatshield comprising a main body having a leading edge, a trailing edge, lateral edges, a first surface and a second surface, the first surface being exposed to a hot working gas in use passing through the gas turbine engine. The main body having an array of cooling channels for conveying a coolant flow. At least one cooling channel has a cross-sectional shape that is polygonal, advantageously quadrilateral. Advantageously, all cooling channels have a cross-sectional shape that is polygonal, advantageously quadrilateral. Advantageously, all cooling channels have a cross-sectional shape that is rectangular, triangular or trapezoidal.

Yet further, to address the known problems there is provided a heatshield for a gas turbine engine. The heatshield comprising a main body having a leading edge, a trailing edge, lateral edges, a first surface and a second surface, the first surface being exposed to a hot working gas in use passing through the gas turbine engine. The main body having an array of cooling channels for conveying a coolant flow, where each cooling channel of the array of cooling channels having and a surface. The array of cooling channels comprising a leading array of cooling channels and a trailing array of cooling channels. Each of the leading array of cooling channels and trailing array of cooling channels comprising parallel, especially straight cooling channels which each extend in a direction generally perpendicular to the respective leading edge and trailing edge. The cooling channels of the trailing array of cooling channels being longer than the cooling channels of leading array of cooling channels.

The main body has a dimension L that is perpendicular to the leading edge and the trailing edge and the cooling channels of the trailing array of cooling channels may extend 55-70% of L, advantageously 60% of L, and the cooling channels of leading array of cooling channels may extend 30-45% of L, advantageously 40% of L.

BRIEF DESCRIPTION OF THE DRAWINGS

The above-mentioned attributes and other features and advantages of this invention and the manner of attaining them will become more apparent and the invention itself will be better understood by reference to the following description of embodiments of the invention taken in conjunction with the accompanying drawings, wherein.

DETAILED DESCRIPTION OF INVENTION

Figure 1:
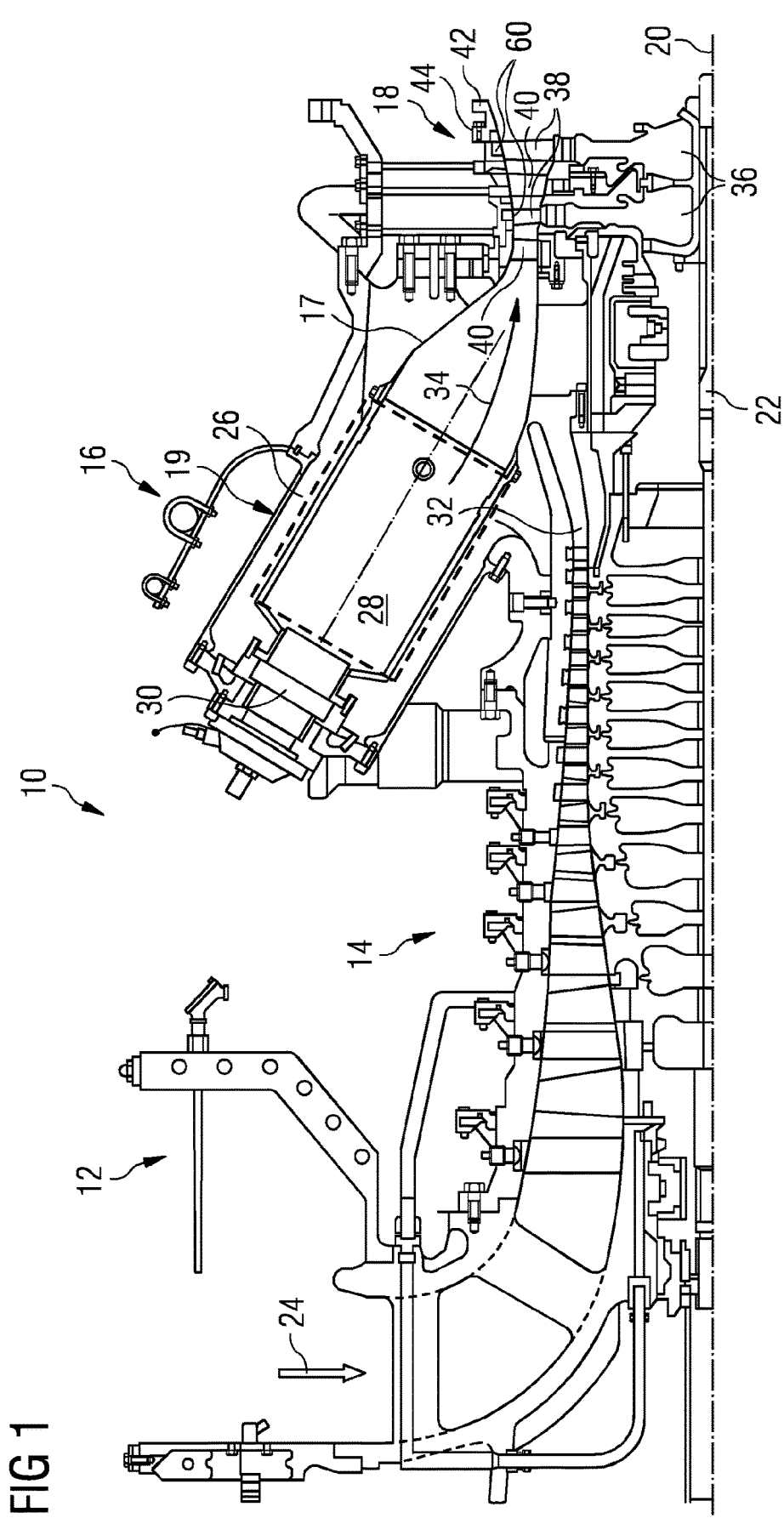
FIG. 1 shows part of a turbine engine in a sectional view and in which the present heatshield is incorporated.
Figure 2:
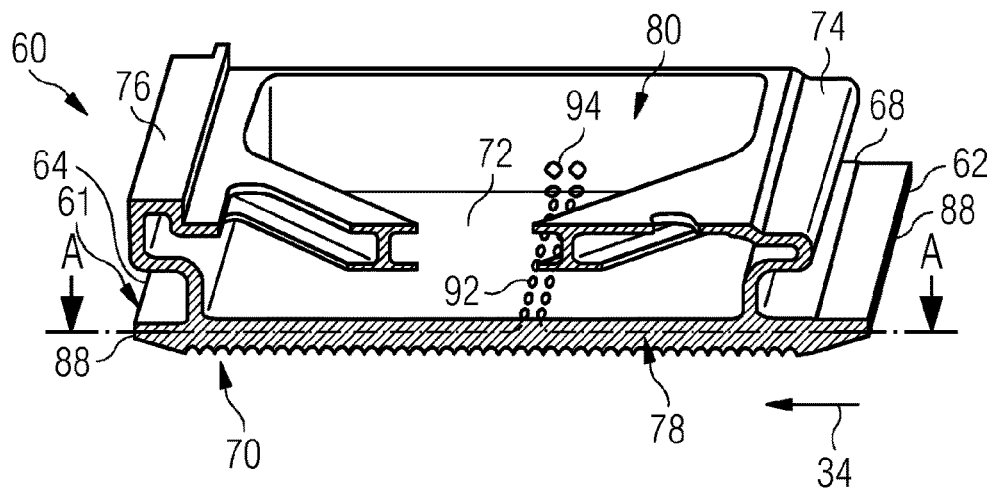
FIG. 2 is a perspective view of a section through the present heatshield and showing an array of cooling channels for conveying a coolant flow through a main body of the heatshield.

FIG. 1 shows an example of a gas turbine engine 10 in a sectional view. The gas turbine engine 10 comprises, in flow series, an inlet 12, a compressor section 14, a combustor section 16 and a turbine section 18 which are generally arranged in flow series and generally about and along the direction of a longitudinal or rotational axis 20. The gas turbine engine 10 further comprises a shaft 22 which is rotatable about the rotational axis 20 and which extends longitudinally through the gas turbine engine 10. The shaft 22 drivingly connects the turbine section 18 and the compressor section 14.

In operation of the gas turbine engine 10, air 24, which is taken in through the air inlet 12 is compressed by the compressor section 14 and delivered to the combustion section or burner section 16. The burner section 16 comprises a burner plenum 26, one or more combustion chambers 28 and at least one burner 30 fixed to each combustion chamber 28. The combustion chambers 28 and the burners 30 are located inside the burner plenum 26. The compressed air passing through the compressor 14 enters a diffuser 32 and is discharged from the diffuser 32 into the burner plenum 26 from where a portion of the air enters the burner 30 and is mixed with a gaseous and/or liquid fuel. The air/fuel mixture is then burned and the combustion gas 34 or working gas from the combustion is channeled through the combustion chamber 28 to the turbine section 18 via a transition duct 17.

This exemplary gas turbine engine 10 has a cannular combustor section arrangement 16, which is constituted by an annular array of combustor cans 19 each having the burner 30 and the combustion chamber 28. The transition duct 17 has a generally circular inlet that interfaces with the combustion chamber 28 and an outlet in the form of an annular segment. An annular array of transition duct outlets form an annulus for channeling the combustion gases to the turbine 18. In other examples, the combustor section 16 may be an annular combustor as known in the art.

The turbine section 18 comprises a number of blade carrying discs 36 attached to the shaft 22. In the present example, two discs 36 each carry an annular array of turbine blades 38. However, the number of blade carrying discs could be different, i.e. only one disc or more than two discs. In addition, guiding vanes 40, which are fixed to a stator 42 of the gas turbine engine 10, are disposed between the stages of annular arrays of turbine blades 38. Between the exit of the combustion chamber 28 and the leading turbine blades 38 inlet guiding vanes 40 are provided and turn the flow of working gas onto the turbine blades 38.

The combustion gas from the combustion chamber 28 enters the turbine section 18 and drives the turbine blades 38 which in turn rotate the shaft 22. The guiding vanes 40 serve to optimise the angle of the combustion or working gas on the turbine blades 38.

The stator 42 of the turbine section 18 further comprises a carrier 44 and an annular array of heatshields 60 mounted to the carrier 44 and partly defining a working gas path through the turbine section. The heatshields 60 are mounted radially outwardly of the rotor blades 38. In other gas turbine engines, the heatshields 60 may be mounted between annular arrays of rotor blades 38 and/or may be mounted on the radially inner casing.

The present invention is described with reference to the above exemplary turbine engine having a single shaft or spool connecting a single, multi-stage compressor and a single, one or more stage turbine. However, it should be appreciated that the present invention is equally applicable to two or three shaft engines and which can be used for industrial, aero or marine applications.

The terms upstream and downstream refer to the flow direction of the airflow and/or working gas flow through the engine unless otherwise stated. The terms forward and rearward refer to the general flow of gas through the engine. The terms axial, radial and circumferential are made with reference to the rotational axis 20 of the engine.

The term 'heatshield' is used to denote not only a heatshield 60 as described herein, but also refers to a circumferential segment or a blade outer air seal (BOAS) or a shroud of a turbine system 18 of the gas turbine engine 10.

The present heatshield 60 will now be described with reference to FIGS. 2 to 8.

Referring to FIGS. 2 to 6, the heatshield 60 is a circumferential segment of an annular array of circumferential segments that form part of the gas washed outer surface of the gas path through the turbine section 18. The heatshield 60 is located radially outwardly of rotating blades 38 and forms a tip gap therebetween.

The heatshield 60 has a main body 61, a leading edge 62, a trailing edge 64 and, when viewed looking axially downstream, to the left and to the right lateral edges 66, 67 respectively. When installed in a gas turbine engine immediately and circumferentially adjacent heatshields 60 may abut or be in close proximity to one another such that one left lateral edge 66 is facing one right lateral edge 67 and a gap may exist therebetween. The heatshield 60 has a first surface or gas washed surface 70, which is also a radially inner surface and that partly defines the radially outer gas washed surface of the gas path in the turbine section 18. The gas washed surface 70 may also be referred to as the hot side, that being subject to the hot working gases flowing through the gas path. The heatshield 60 has a second surface or cold side or surface 72 which is a radially outer surface relative to the hot gas flow.

The heatshield 60 is mounted to the casing 58 by a front hook or hanger 74 and a rear hook or hanger 76. The front hook 74 and the rear hook 76 engage with corresponding features on the carrier 44. Other or additional securing means for securing the heatshield to the carrier 44 or other supporting structure may be provided as known in the art.

The heatshield 60 has a centre-line 21 which when viewed radially inwardly towards the rotational axis 20 of the gas turbine 10 is parallel to the rotational axis 20. The heatshield 60 is generally symmetrical about its centre-line 21. The heatshield 60 is generally arcuate when viewed along centre-line 21 and its curvature is that of part of the circumferential surface of the array of heatshields 60 that forms the gas washed surface of the turbine section 18.

The main body 61 has an array of cooling channels 78 for conveying a coolant flow 80, which is supplied to the cold side 72 of the heatshield 60 via the carrier 44. The array of cooling channels 78 comprises a leading array of cooling channels 82 and a trailing array of cooling channels 84. Each of the leading array of cooling channels 82 and trailing array of cooling channels 84 comprises parallel, straight cooling channels 86 which each extend in a direction generally perpendicular to the respective leading edge 62 and trailing edge 64.

Figure 3:
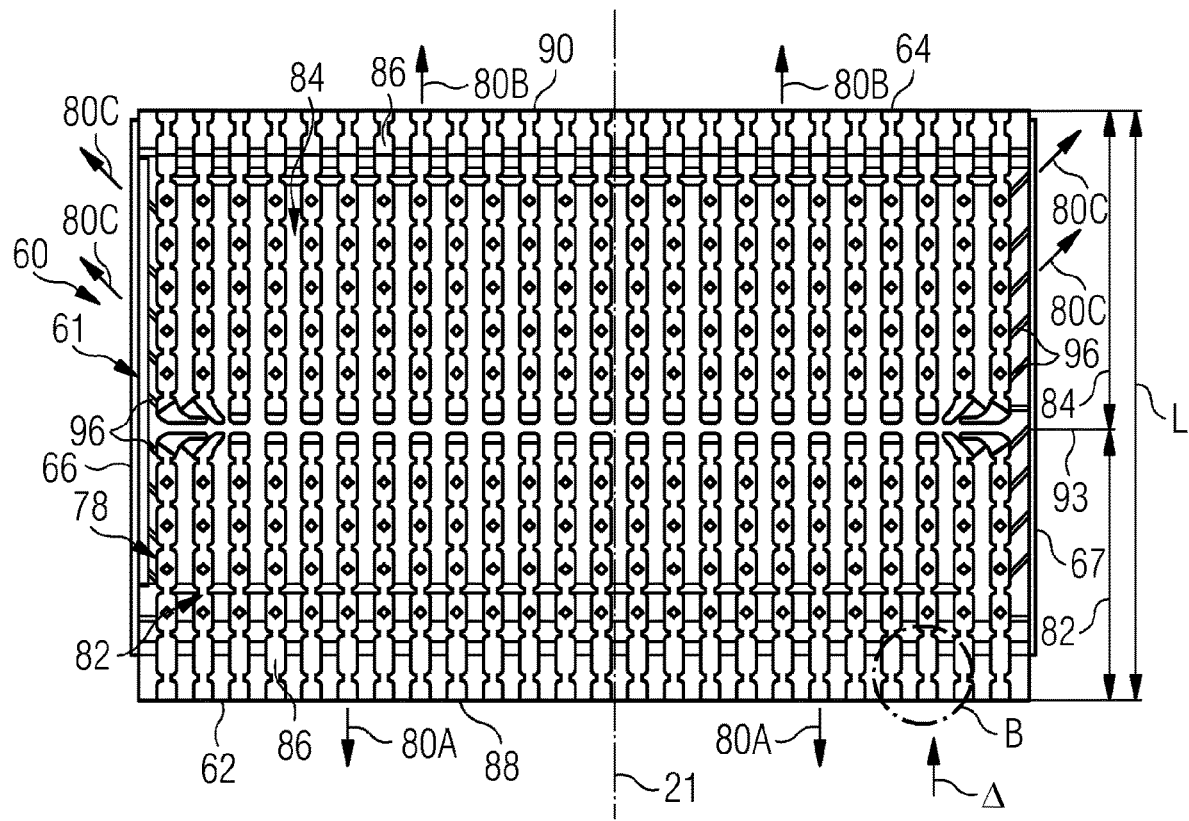
FIG. 3 is a complete section A-A of the present heatshield showing a radially inward view of the array of cooling channels for conveying the coolant flow through the main body of the heatshield.

Each cooling channel 86 of leading array of cooling channels 82 has an outlet 88 in the leading edge 62 and each cooling channel 86 of the trailing array of cooling channels 84 has an outlet 90 in the trailing edge 64 of the main body 61. Each cooling channel 86 has an inlet 92, 94 formed in the second surface 72. In this embodiment, there is no gallery feeding multiple cooling channels 86. In addition, the cooling passages 68 located closest to the lateral edges 66, 67 of the main body 61 each have a plurality of outlets 96 defined in the respective lateral edge 66, 67. As can be seen in FIG. 3 the outlets 96 are short lateral cooling passages that extend from the cooling channel 68 to the lateral edge of the heatshield. Although not shown, the outlets 96 are located radially inwardly of a seal strip that seals between immediately adjacent heatshields and is usually located in a groove in the lateral edge or surface. At least a part of the cooling passages 68 located closest to the lateral edges 66, 67 is located radially inwardly of the seal strip.

One aspect of the heatshield 60 that is not symmetrical is that each of the plurality of outlets 96 defined in lateral edge 66 is off-set, in the axial direction or along the edges 66, 67, from the other plurality of outlets 96 defined in lateral edge 67. For two immediately adjacent heatshields the lateral edge 66 of one heatshield opposes the lateral edge 67 of the other heatshield 60. The outlets 96 in lateral edge 66 are formed such that the jets of coolant issuing therefrom impinge on the surface of lateral edge 67 and not on the outlets 96 of the lateral edge 67. Similarly, the outlets 96 in lateral edge 67 are formed such that the jets of coolant impinge on the surface of lateral edge 66 and not on the outlets 96 of the lateral edge 66. Thus, for any one heatshield 60, the outlets and short lateral cooling passages that extend from the cooling channel 68 located closest to each of the lateral edges 66, 67 are not quite symmetrical about the centre line 21. This off-set arrangement of outlets 96 ensures very good sealing between adjacent heatshields and provides very good cooling of the lateral edges 66, 67.

In use, pressurised coolant 80, usually air bled from the compressor, is supplied via the carrier 44 to the cold side 72 of the heatshield 60. The coolant 80 enters the cooling passage 68 through the inlets 92, 94, passes along the cooling channels 68 and is exhausted through the outlets 88, 90, 96 at the leading, trailing and the lateral edges 62, 64, 66, 67 respectively as coolant sub-flows 80A, 80B and 80C respectively. Exhausting the coolant 80 at the edges of the heatshield helps to prevent hot working gases entering the gaps surrounding the heatshield 60. Exhausting the coolant 80 at the edges of the heatshield 60 also helps to prevent hotspots at and near to the edges 62, 64, 66, 67 of the heatshield 60. Further, any temperature gradient is minimised across the entire main body 61 of the heatshield 60.

The cooling passages 68 located closest to the lateral edges 66, 67 of the main body 61 have larger inlets 94 than the inlets 92 of the other cooling channels 68 in order to have a greater coolant flow than the other cooling channels 68 and adequately feed the outlets 96 to the lateral edges 66, 67 as well as their outlets 88, 90 in the leading and trailing edges 62, 64 respectively. In this exemplary embodiment, the cooling passages 68 located closest to the lateral edges 66, 67 have the same cross-sectional shape and area as the other cooling channels 68; however, it is possible for the cooling passages 68 located closest to the lateral edges 66, 67 to have a greater cross-sectional area and/or shape to allow a greater amount of coolant to flow into their inlet and through the cooling channel so that their lateral outlets 96 and outlets 88, 90 at the leading and trailing edges 62, 64 are adequately supplied with coolant.

To further reduce the temperature gradient and absolute temperature of the main body 61, the cooling channels 68 of the trailing array of cooling channels 84 are longer, in the axial direction 20, 21, than the cooling channels 68 of leading array of cooling channels 82. The pressure and temperature of the working gas at the leading edge 62 is higher than at the trailing edge 64 and the lengths of the trailing array of cooling channels 84 and of the leading array of cooling channels 82 are such that adequate coolant is passed through the leading array of cooling channels 82 as well as the trailing array of cooling channels 84. In other words the lengths of the trailing array of cooling channels 84 and leading array of cooling channels 82 are such that the pressure losses along the respective cooling channels are balanced against the pressure outside their outlets such that there is a positive pressure of coolant in the cooling channels to provide an adequate flow of coolant through each cooling channel for its cooling demand. The main body 61 has a dimension L that is perpendicular to the leading edge 62 (i.e. axial length) and the trailing edge 64 and the cooling channels 68 of the trailing array of cooling channels 84 extend 55-70% of L and in the embodiment shown 60% of L. The cooling channels 68 of leading array of cooling channels 82 extend 30-45% of L and in the embodiment shown 40% L. Note that these relative dimensions are considered from a central point or line 93 between the inlets 92 of trailing array of cooling channels 84 and the inlets 92 of the leading array of cooling channels 82.

The cooling effectiveness of the cooling arrangement of the present heatshield is greatly enhanced by at least one, but advantageously all, cooling channels 68 of the array of cooling channels 78 comprising at least one flow disturbing feature 100. The cooling channel(s) has a cross-sectional shape that is a quadrilateral, in this example rectangular, has a surface 104 over which the coolant flows. In this exemplary embodiment the surface 104 is formed of a radially inner surface 108, radially outer surface 106 and lateral surfaces 105, 107. In this embodiment, there are a number of flow disturbing features 100 namely pins 102 and part-pins 110 and which generally extend from the surface 104 and into the cooling channel 68.

The pins 102 extend from the surface 108 to the surface 106 such that its sides 112 are free of contact with the surface 104 of the cooling channel 68. In other words, the pins 102 are only attached to the surface 104 at its ends 114, 116. The pin(s) 102 is located equidistant from the lateral surfaces 105, 107 within the cooling channel 68, although in other embodiments the pins 102 may be off-set and nearer one lateral surface 105, 107 than the other lateral surface 107, 105. The pins 102 have a cross-sectional shape of a diamond, but other polygonal shapes are possible such as quadrilaterals or parallelograms. The pin has a diagonal line 120, defined between two opposing edges that are defined by its sides 112, which is in-line with the longitudinal axis 118 of the cooling channel 68.

Figure 4:
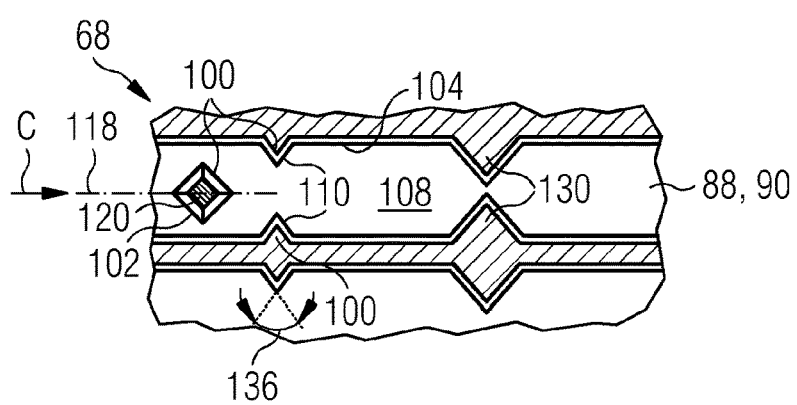
FIG. 4 is an enlarged view B, shown on FIG. 3, of a cooling channel of the array of cooling channels of the present heatshield, and a number of flow disturbing features can also be seen.
Figure 5:
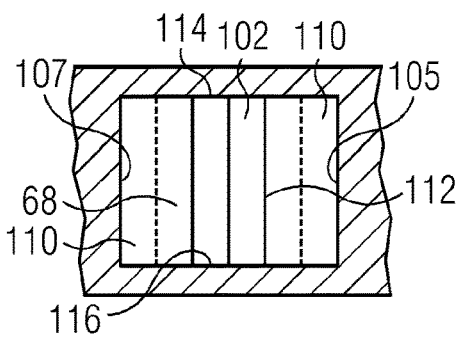
FIG. 5 is a view in the direction of arrow C, shown in FIG. 4, and shows rectangular cross-section cooling channels and one of the flow disturbing features.

Another flow disturbing feature 100 is a part-pin 110 which has a similar cross-sectional shape as one half of the pin 102 when divided by a plane that is perpendicular to view of FIG. 4 and defined by the diagonal line 120. The part-pin is 110 is shown in dashed lines on FIG. 5 and is attached along its length to another side 107 of the cooling channel 68 such that there are two side surfaces and one edge extending from the surface 104. The (first) part-pin 110 is also attached to the cooling channel 68 via its ends to surface 106 and surface 108. As shown in FIG. 4 and FIG. 5 this flow disturbing feature 100 comprises a second part-pin 110 arranged on the opposite surface 105 to the first part-pin 110 and across the cooling channel 68.

The total and minimum flow area of the cooling channel 68 at a cross-section through the pin 102 is approximately equal to the minimum flow area of the cooling channel 68 between the opposing part-pins 110.

Referring to FIG. 3, each cooling channel 68 comprising an array of flow disturbing features 100 has a number of pins 102 and opposing (first and second) part-pins 110 along at least a part of a length of the cooling channel 68. The array of flow disturbing features 100 is formed by an alternating pattern of one pair of opposing (first and second) part-pins 110 and then one pin 102 or vice-versa.

It should be appreciated that other arrangements of the pair of opposing (first and second) part-pins 110 and pins 102 are possible and the first and second part-pins 110 do not need to be aligned across the cooling channel and instead may be off-set. Indeed, it is possible to have various cooling arrangements with no pins and only part-pins 110 or no part-pins 110 and only pins 102. Where there are no part-pins, each pin 102 of an array of pins 102 may be positioned off-set from the centre-line 118 of the cooling channel 68. Where there are no pins 102, the part-pins 110 may be attached along their length to only one surface e.g. surface 108, or more than one surface e.g. surfaces 105, 106, 107, 108 and each consecutive part-pin 110 may be attached to any of the surfaces 105, 106, 107, 108. Further, the pins 102 are shown extending from surface 108 to surface 106, but may extend between surface 105 to surface 107. Similarly, the part-pins 110 are shown extending from surface 108 to surface 106, but may extend between surface 105 to surface 107.

In the FIG. 4 example of the present heatshield each cooling channel 68 further comprises a restrictor 130. The restrictor 130 forms the smallest cross-sectional area within the cooling channel 68 and controls the quantity of coolant passing through the cooling channels 68. The flow restrictor 130 is essentially the same cross-sectional shape and general configuration as an opposing pair of part-pins 110 except that the restrictor 130 is larger and as mentioned before forms a flow cross-sectional area of the cooling channel 68 that is smaller than the flow areas around the pin 102 and through the opposing pair of part-pins 110. The restrictor 130 is positioned downstream of the pins 102 and part-pins 110 with respect to the coolant flowing along the cooling channel 68 from the inlet 92, 94 to the outlet 88. The restrictor 130 is located very close to the outlet 88.

In other embodiments of the present heatshield 60, and to balance heat transfer or the cooling effect across the heatshield 60, not all cooling channels 68 have a restrictor 130 or the restrictor 130 may be sized differently; that is the flow area of the restrictor 130 may be tuned for one or a number of the cooling flow channels 68. For example, the leading array of cooling channels 82 may have no restrictor 130 or a restrictor with a greater flow area than the trailing array of cooling channels 84, thereby preferentially supplying coolant to the leading array of cooling channels 82. In another example, either or both the leading array of cooling channels 82 and trailing array of cooling channels 84 may have a number of cooling channels nearest the lateral edges 66, 67 with no restrictor 130 or a restrictor with a greater flow area than the cooling channels 68 nearer the centre-line 21; thus, preferentially cooling the lateral edge regions of the heatshield 60.

Conveniently, the heatshield 60 may be designed for all versions of a particular gas turbine and the restrictor 130 alone can be simply modified to tailor the amount of coolant through each of the cooling channels 68 dependent on the version of the engine. Different versions of the gas turbine, e.g. different power outputs, mean that the working gas temperature and/or pressure may be different so in a high output gas turbine the restrictor 130 is removed or its flow area increased in some or all the cooling channels. Furthermore, modifications of the restrictor 130 only may be easily made for and during engine development testing.

In use, the coolant 80 enters the cooling passages 68 through the inlets 92, 94, passes along the cooling channels 68 and is exhausted through the outlets 88, 90, 96 at the leading, trailing and the lateral edges 62, 64, 66, 67 respectively as coolant sub-flows 80A, 80B and 80C respectively. As the coolant 80 passes along the cooling passages 68 the flow disturbing feature(s) 100 creates disturbances or vortices in the coolant flow. These vortices not only mix the coolant within the cooling passages 68 and prevent lamina flow over the surfaces 104. Lamina flow or boundary layers can cause the hottest coolant to remain against the surface 104 along the cooling passage 68 and diminish the cooling effect the further downstream the coolant flows. In other words, allowing boundary layers or lamina flow can cause a severe and detrimental temperature gradient in the coolant across the cooling passage. By introducing the flow disturbing feature(s) 100 the coolant is mixed and therefore the cooling effect significantly improved compared to a smooth undisturbed passage. In addition, the flow disturbing feature(s) 100 increase the surface area of the cooling passage 68 increasing heat transfer from the heatshield 60 to the coolant. Yet further, the coolant also impinges on the flow disturbing feature 100 and subsequently the vortices impinge on the surfaces enhancing heat transfer.

Figure 6:
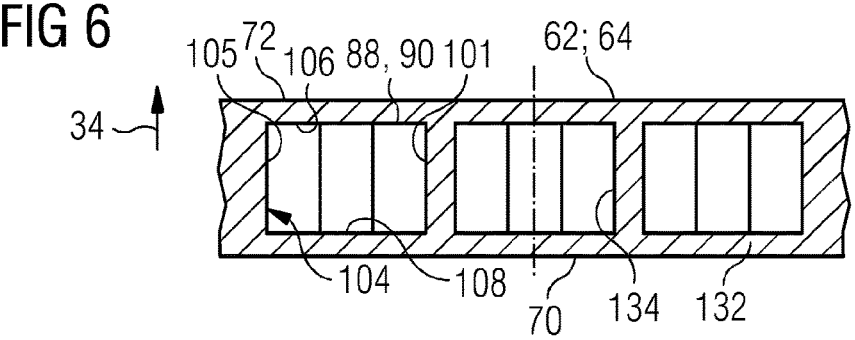
FIG. 6 is an enlarged view in the direction of arrow D, shown on FIG. 3, of a number of cooling channels of the array of cooling channels of the present heatshield.
Figure 7:
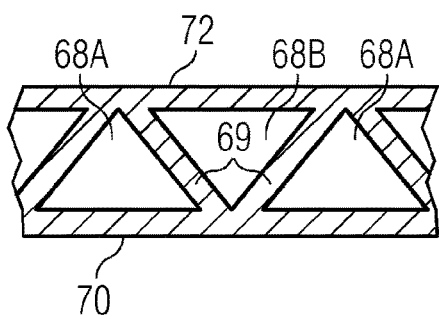
FIG. 7 is a view in the direction of arrow D, shown in FIG. 3, and shows triangular cross-section cooling channels.
Figure 8:
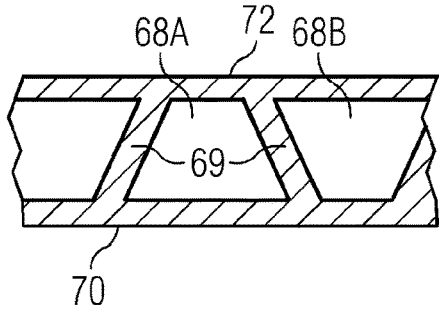
FIG. 8 is a view in the direction of arrow D, shown in FIG. 3, and shows trapezoidal cooling channels.

In another aspect of the present heatshield 60, the cooling channels 68 have a cross-sectional shape that is rectangular although other polygonal and advantageously quadrilateral shapes are possible. FIG. 6 shows the outlets 88, 90 are rectangular although the corners may have small radii. This rectangular cross-sectional shape allows a greater cross-sectional area of the cooling passages than conventional circular cross-section. This configuration means that there is less material for a given thickness and/or length of the main body 61 of the heatshield 60 than conventional designs having circular cross-sectional cooling passages i.e. the main body 61 has thinner walls 132, 134 than conventionally and so can be cooled more effectively. Other particularly useful cross-sectional shapes of the cooling channels 68 are triangular and trapezoidal and are shown in FIG. 7 and FIG. 8 respectively. In each case one cooling channel 68A is next to another cooling channel 68B that is inverted. This arrangement ensures that there is a planar wall 69 between each cooling channel 68A, 68B and that has a minimum thickness. Therefore, there is a higher ratio of cooling channel to surface area of wall in the views shown in FIGS. 6, 7 and 8 than conventional designs.

It is particularly advantageous that the most lateral cooling channel can be located very close to the lateral edge of the main body 61 to combat potential oxidation problems associated with particularly high metal temperatures that would otherwise be found. It is particularly advantageous that the outlets 96 and lateral-most cooling channels are formed radially inwardly of the seal strip in the lateral edges. The surface area of the cooling channels 68 is also increased from the conventionally drilled circular cross-section passages.

The conventional circular cross-sectional cooling holes are formed by conventional processes such a machine drilling, electric discharge machining and laser boring, other processes may be apparent. The present heatshield is formed by an additive manufacturing process such as direct laser deposition, selective laser melting, and other 3D printing techniques, material jetting, material extrusion or powder bed fusion. The additive manufacturing process allows manufacturing of a monolithic heat shield comprising the aforementioned cooling channels to be formed in their rectangular cross-section shape which is not possible by the convention fabrication methods. Similarly, the flow disturbing features are also possible, whereas the conventional machining techniques allow only smooth and circular cross-sectional shaped cooling channels.

In the additive manufacturing process, it is preferable that all corners or angles 136 between connected sides of the heatshield or elements of the heatshield and particularly the flow disturbing features 100 have an angle ≥45°. It has been found that features having geometry having an external angle less than 45° requires additional supporting structure during manufacture and which then requires removal. This is not possible for the flow disturbing features 100 which are inside the cooling channels.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A heatshield for a gas turbine engine, comprising:
a main body having a leading edge, a trailing edge, lateral edges, a first surface and a second surface, the first surface being exposed to a hot working gas in use passing through the gas turbine engine,
the main body having an array of cooling channels for conveying a coolant flow, each cooling channel of the array of cooling channels having a surface,
wherein at least one cooling channel of the array of cooling channels comprises at least one flow disturbing feature extending from the surface and into the cooling channel,
wherein the at least one flow disturbing feature comprises a cross-sectional shape of a convex polygon, and
wherein the cross-sectional shape comprises a diagonal line between opposite corners of the cross-sectional shape, and the diagonal line is in-line with a longitudinal extent of the cooling channel.

2. The heatshield as claimed in claim 1,
wherein the at least one flow disturbing feature is a pin.

3. The heatshield as claimed in claim 1,
wherein another at least one flow disturbing feature is a part-pin that is discrete from the at least one flow disturbing feature, the part-pin being attached along its length to another side of the cooling channel.

4. The heatshield as claimed in claim 3,
wherein the another at least one flow disturbing feature comprises a second part-pin that is discrete from the at least one flow disturbing feature and discrete from the another at least one flow disturbing feature,
wherein the part-pin and the second part-pin are arranged opposite one another across the cooling channel.

5. The heatshield as claimed in claim 4,
wherein the at least one cooling channel comprises an array of the pin(s) and/or the part-pin(s) and/or the second/part pin(s) along at least a part of a length of the cooling channel.

6. The heatshield as claimed in claim 1,
wherein the at least one flow disturbing feature has a plurality of side faces, and wherein an angle between any two neighbouring side faces is ≥45°.

7. The heatshield as claimed in claim 1,
wherein the at least one cooling channel comprises a restrictor, the restrictor forming a smallest cross-sectional area within the cooling channel.

8. The heatshield as claimed in claim 1,
wherein the array of cooling channels comprises a leading array of cooling channels and a trailing array of cooling channels,
wherein each of the leading array of cooling channels and the trailing array of cooling channels comprises parallel cooling channels which each extend in a direction generally perpendicular to the leading edge and trailing edge,
wherein the cooling channels of the trailing array of cooling channels are longer than the cooling channels of leading array of cooling channels.

9. The heatshield as claimed in claim 8,
wherein the main body has a dimension (L) that is perpendicular to the leading edge and/or the trailing edge, and
wherein the cooling channels of the trailing array of cooling channels extend 55-70% of L, and
wherein the cooling channels of leading array of cooling channels extend 30-45% of L.

10. The heatshield as claimed in claim 8,
wherein each cooling channel of the leading array of cooling channels having an outlet in the leading edge of the main body, and
wherein each cooling channel of the trailing array of cooling channels having an outlet in the trailing edge of the main body.

11. The heatshield as claimed in claim 1,
wherein each cooling channel has an inlet formed in the second surface.

12. The heatshield as claimed in claim 1,
wherein cooling channels located closest to the lateral edges of the main body have a plurality of cooling outlets defined in a respective lateral edge such that in use coolant passes out of the cooling channel, through the plurality of cooling outlets and is exhausted at the respective lateral edge,
wherein each cooling channel has an inlet formed in the second surface, and,
wherein the inlet of the cooling channel(s) located closest to the lateral edges of the main body is larger than inlets of other cooling channels.

13. The heatshield as claimed in claim 1,
wherein the at least one cooling channel has a cross-sectional shape that is polygonal.

14. The heatshield as claimed in claim 2,
wherein the pin extends from one part of the surface to another part of the surface such that its sides are free of contact with the surface of the cooling channel.

15. The heatshield as claimed in claim 5,
wherein the pin(s) and the part-pin(s) and/or the second/part pin(s) are arranged in an alternating pattern.

16. The heatshield as claimed in claim 1,
wherein the cross-sectional shape of the at least one flow disturbing feature is a quadrilateral or a parallelogram.

17. The heatshield as claimed in claim 9,
wherein the cooling channels of the trailing array of cooling channels extend 60% of L.

18. The heatshield as claimed in claim 9,
wherein the cooling channels of leading array of cooling channels extend 40% L.

19. The heatshield as claimed in claim 1,
wherein the at least one cooling channel has a cross-sectional shape that is quadrilateral, triangular, or trapezoidal.

20. The heatshield as claimed in claim 1, wherein the longitudinal extent of the cooling channel is a center line of the cooling channel.

* * * * *